(12) United States Patent
Yang et al.

(10) Patent No.: US 10,170,923 B2
(45) Date of Patent: *Jan. 1, 2019

(54) ADAPTIVE BUCK CONVERTER WITH MONITOR CIRCUIT AND CHARGING CABLE USING THE SAME

(71) Applicant: RICHTEK TECHNOLOGY CORPORATION, Chupei, Hsinchu (TW)

(72) Inventors: Ta-Yung Yang, Taoyuan (TW); Jing-Meng Liu, Hsinchu County (TW); Isaac Y. Chen, Hsinchu County (TW); Tzu-Chen Lin, Changhua County (TW)

(73) Assignee: RICHTEK TECHNOLOGY CORPORATION, Chupei, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/951,759

(22) Filed: Apr. 12, 2018

(65) Prior Publication Data

US 2018/0233937 A1    Aug. 16, 2018

Related U.S. Application Data

(63) Continuation-in-part of application No. 15/013,459, filed on Feb. 2, 2016, now Pat. No. 9,979,214.
(Continued)

(51) Int. Cl.
*H02J 7/00* (2006.01)
*H02M 3/158* (2006.01)

(52) U.S. Cl.
CPC .......... *H02J 7/0052* (2013.01); *H02J 7/0068* (2013.01); *H02J 7/0091* (2013.01);
(Continued)

(58) Field of Classification Search
CPC ...... H02J 7/0044; H02J 7/0042; H02J 7/0052; H02J 7/0055; H02J 7/007; H02J 7/0072; H02J 2007/0059; H02J 2007/0062
(Continued)

(56) References Cited

U.S. PATENT DOCUMENTS

| 6,184,659 B1 * | 2/2001 | Darmawaskita ...... H02J 7/0052 320/137 |
| 6,741,066 B1 | 5/2004 | Densham et al. |

(Continued)

FOREIGN PATENT DOCUMENTS

| JP | 2009-303478 A | 12/2009 |
| JP | 5031020 B2 | 9/2012 |

(Continued)

OTHER PUBLICATIONS

Two-Stage Interleaved Synchronous Buck Converter, Abedinpout et al, 2006, pp. 5315-5318.*
(Continued)

*Primary Examiner* — Nathaniel Pelton
(74) *Attorney, Agent, or Firm* — Birch, Stewart, Kolasch & Birch, LLP

(57) ABSTRACT

An adaptive buck converter of a charging cable includes: a power receiving interface for receiving a DC voltage and a cable current from a cable; a terminal communication interface for transmitting a charging voltage and a charging current to a connection terminal of the charging cable and for receiving a communication signal generated by a mobile device from the connection terminal; a power converting circuit for receiving the DC voltage and the cable current from the power receiving interface and for generating the charging voltage and the charging current; a monitor circuit arranged to operably detect the DC voltage or the cable current; and a data processing circuit configured for con-
(Continued)

trolling the power converting circuit according to the communication signal. The data processing circuit further communicates with the mobile device through the terminal communication interface and the connection terminal in response to a detection result of the monitor circuit.

20 Claims, 6 Drawing Sheets

Related U.S. Application Data

(60) Provisional application No. 62/277,737, filed on Jan. 12, 2016.

(52) U.S. Cl.
CPC ... *H02M 3/1582* (2013.01); *H02J 2007/0059* (2013.01); *H02J 2007/0062* (2013.01)

(58) Field of Classification Search
USPC .......................................................... 320/114
See application file for complete search history.

(56) References Cited

U.S. PATENT DOCUMENTS

| | | | |
|---|---|---|---|
| 2007/0001646 A1* | 1/2007 | Kojima | H02J 7/0011 320/128 |
| 2007/0230227 A1* | 10/2007 | Palmer | H02J 7/0004 363/78 |
| 2007/0236169 A1 | 10/2007 | Purdy et al. | |
| 2008/0231235 A1 | 9/2008 | Thijssen | |
| 2009/0001937 A1 | 1/2009 | Densham et al. | |
| 2009/0132730 A1 | 5/2009 | Kim et al. | |
| 2011/0254511 A1 | 10/2011 | Tam | |
| 2012/0119696 A1 | 5/2012 | Picard | |
| 2013/0335024 A1 | 12/2013 | Akai et al. | |
| 2014/0145679 A1 | 5/2014 | Chen | |
| 2015/0022141 A1 | 1/2015 | Oku | |
| 2015/0318707 A1 | 11/2015 | Huynh | |
| 2015/0349563 A1 | 12/2015 | Bishtein et al. | |
| 2016/0254689 A1 | 9/2016 | Lee et al. | |
| 2017/0187218 A1 | 6/2017 | Thomsen et al. | |

FOREIGN PATENT DOCUMENTS

| | | |
|---|---|---|
| JP | 2015-8416 A | 1/2015 |
| JP | 2015-23712 A | 2/2015 |
| JP | 2015-142396 A | 8/2015 |
| WO | WO 2005/109583 A2 | 11/2005 |
| WO | WO 2007/133038 A1 | 11/2007 |
| WO | WO 2014/194810 A1 | 12/2014 |
| WO | WO 2015/113341 A1 | 8/2015 |
| WO | WO 2015/113463 A1 | 8/2015 |

OTHER PUBLICATIONS

Abedinpour et al., "A 65MHZ Switching Rate, Two-Stage Interleaved Synchronous Buck Converter with Fully Integrated Output Filter," 2006 IEEE International Symposium on Circuits and Systems, Island of Kos, Greece, May 21-24, 2006, XP032458956, pp. 5315-5318.
European Communication Pursuant to Article 94(3) EPC for European Application No. 16156451.3, dated Jan. 29, 2018.
Extended European Search Report, dated Aug. 1, 2017, for European Application No. 16156451.3.
Japanese Notification of Reasons for Refusal for Japanese Application No. 2016-090935, dated Dec. 26, 2017, with English translation.
Japanese Office Action, dated Apr. 4, 2017, for Japanese Application No. 2016-090935, with an English translation.
U.S. Office Action, dated Nov. 16, 2017, for U.S. Appl. No. 15/013,459.
U.S. Office Action, dated Oct. 19, 2017, for U.S. Appl. No. 15/013,493.
Chinese Office Action and Search Report for Chinese Application No. 201610076694.6, dated Oct. 8, 2018, with partial English translation of the Office Action and English translation of the Search Report.
Korean Office Action for Korean Application No. 10-2016-0030802, dated May 28, 2018, with an English translation.

* cited by examiner

ADAPTIVE BUCK CONVERTER WITH MONITOR CIRCUIT AND CHARGING CABLE USING THE SAME

CROSS-REFERENCE TO RELATED APPLICATIONS

This application is a Continuation-In-Part of and claims the benefit of priority to U.S. patent application Ser. No. 15/013,459, filed on Feb. 2, 2016, which claims the benefit of U.S. Provisional Application Ser. No. 62/277,737, filed on Jan. 12, 2016; the entirety of which is incorporated herein by reference for all purposes.

BACKGROUND

The disclosure generally relates to a buck converter and, more particularly, to an adaptive buck converter with a monitor circuit and a charging cable using the same.

The battery capacity is always the major bottleneck to the usage time of a mobile device. Therefore, many technologies and materials have been developed to increase the battery capacity of the mobile device. When the mobile device runs out of battery power, a charging cable is typically employed by the user to connect to the mobile device to recharge the battery.

However, the time required to charge the battery is proportional to the capacity of the battery. For many modern mobile devices, it may take several hours to fully recharge the battery inside the mobile device. It is apparent that the traditional charging cable is a time-consuming and inefficient solution for charging the mobile device.

SUMMARY

An example embodiment of a charging cable for charging a mobile device is disclosed, comprising: an adaptive buck converter; a connection terminal coupled with the adaptive buck converter and utilized for detachably connecting to the mobile device; a cable coupled with the adaptive buck converter; and a power source unit connected to the cable and utilized for supplying a DC voltage and a cable current to the cable; wherein the adaptive buck converter comprises: a power receiving interface arranged to operably receive the DC voltage and the cable current from the cable; a terminal communication interface arranged to operably transmit a charging voltage and a charging current to the connection terminal and to operably receive a communication signal generated by the mobile device from the connection terminal; a power converting circuit, coupled between the power receiving interface and the terminal communication interface, arranged to operably receive the DC voltage and the cable current from the power receiving interface and to operably generate the charging voltage and the charging current, wherein the charging voltage is lower than the DC voltage while the charging current is greater than the cable current; a monitor circuit, coupled with a signal path between the power receiving interface and the power converting circuit, arranged to operably detect the DC voltage or the cable current; and a data processing circuit, coupled with the terminal communication interface and the power converting circuit, arranged to operably control the power converting circuit according to the communication signal; wherein the data processing circuit is further coupled with the monitor circuit and arranged to operably utilize the communication signal to communicate with the mobile device through the terminal communication interface and the connection terminal in response to a detection result of the monitor circuit.

Another example embodiment of an adaptive buck converter of a charging cable is disclosed. The charging cable is utilized for charging a mobile device and comprises a connection terminal utilized for detachably connecting to the mobile device; a cable; and a power source unit utilized for supplying a DC voltage and a cable current to the cable. The adaptive buck converter comprises: a power receiving interface arranged to operably receive the DC voltage and the cable current from the cable; a terminal communication interface arranged to operably transmit a charging voltage and a charging current to the connection terminal and to operably receive a communication signal generated by the mobile device from the connection terminal; a power converting circuit, coupled between the power receiving interface and the terminal communication interface, arranged to operably receive the DC voltage and the cable current from the power receiving interface and to operably generate the charging voltage and the charging current, wherein the charging voltage is lower than the DC voltage while the charging current is greater than the cable current; a monitor circuit, coupled with a signal path between the power receiving interface and the power converting circuit, arranged to operably detect the DC voltage or the cable current; and a data processing circuit, coupled with the terminal communication interface and the power converting circuit, arranged to operably control the power converting circuit according to the communication signal; wherein the data processing circuit is further coupled with the monitor circuit and arranged to operably utilize the communication signal to communicate with the mobile device through the terminal communication interface and the connection terminal in response to a detection result of the monitor circuit.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings.

The same reference numbers may be used throughout the drawings to refer to the same or like parts, components, or operations.

Figure 1:
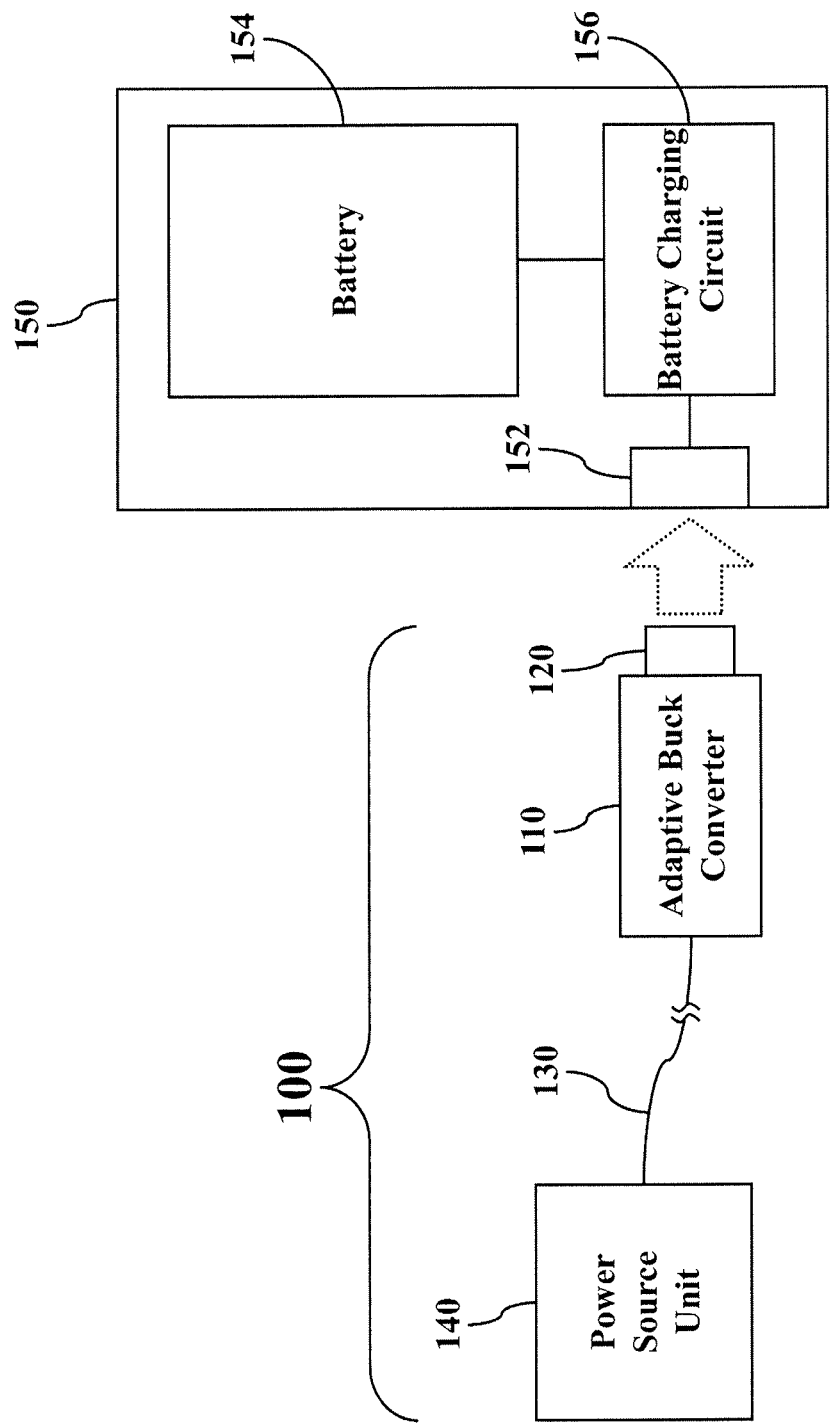
FIG. 1 shows a simplified functional block diagram of a charging cable utilized for charging a mobile device according to one embodiment of the present disclosure.

FIG. 1 shows a simplified functional block diagram of a charging cable 100 utilized for charging a mobile device 150 according to one embodiment of the present disclosure. As shown in FIG. 1, the charging cable 100 comprises an adaptive buck converter 110, a connection terminal 120, a cable 130, and a power source unit 140. The mobile device 150 comprises a connector 152, a battery 154, and a battery charging circuit 156.

In the charging cable 100, the connection terminal 120 is coupled with the adaptive buck converter 110 and utilized for detachably connecting to the connector 152 of the mobile device 150. The cable 130 is coupled with the adaptive buck converter 110. The power source unit 140 is connected to the cable 130. The power source unit 140 is utilized for supplying a programmable DC voltage and a programmable current to the cable 130 in response to an instruction data generated by the adaptive buck converter 110. Then, the adaptive buck converter 110 generates and supplies a DC charging voltage and a charging current for charging the mobile device 150 to the connection terminal 120 based on the programmable DC voltage and the programmable current received from the cable 130.

In the mobile device 150, the connector 152 is utilized for detachably connecting with the connection terminal 120 of the charging cable 100 to receive the charging voltage and the charging current generated by the adaptive buck converter 110 from the connection terminal 120. The battery charging circuit 156 is coupled with the connector 152 and the battery 154 and utilized for controlling the charging operation of the battery 154. For simplicity of illustration, other components in the mobile device 150 and their connection relationships are not illustrated in FIG. 1.

When the connection terminal 120 is connected with the connector 152, the battery charging circuit 156 may transmit an instruction data to the adaptive buck converter 110 to instruct the adaptive buck converter 110 to supply appropriate charging voltage and charging current to the mobile device 150 through the connection terminal 120 and the connector 152. Upon receipt of the instruction data transmitted from the battery charging circuit 156, the adaptive buck converter 110 generates and transmits another instruction data to the power source unit 140 to instruct the power source unit 140 to supply a high-voltage and low-current signal to the adaptive buck converter 110 through the cable 130. The adaptive buck converter 110 converts the high-voltage and low-current signal supplied from the power source unit 140 into a low-voltage and high-current signal, and then transmit the low-voltage and high-current signal to the battery charging circuit 156 through the connection terminal 120 and the connector 152.

For example, the adaptive buck converter 110 may instruct the power source unit 140 to provide a DC voltage VA and a cable current IA to the adaptive buck converter 110 through the cable 130. The adaptive buck converter 110 converts the DC voltage VA and the cable current IA into a charging voltage VB and a charging current IB, and then transmit the charging voltage VB and the charging current IB to the battery charging circuit 156 through the connection terminal 120 and the connector 152. In above situation, the DC voltage VA generated by the power source unit 140 is higher than the charging voltage VB generated by the adaptive buck converter 110, while the cable current IA generated by the power source unit 140 is lower than the charging current IB generated by the adaptive buck converter 110.

Since the cable 130 only needs to transmit a small cable current IA, the cable 130 can be realized with a thin cable, such as a conventional USB (Universal Serial Bus) cable, instead of a thick and short power cable.

From one aspect, the power loss of the cable 130 can be minimized when the cable 130 is realized with a thin cable. From another aspect, there is no special restriction to the length of the cable 130 since the resistance of the thin cable is low.

For the purpose of explanatory convenience in the following description, it is assumed hereinafter that the adaptive buck converter 110 may utilize communication signals X1A and X2A to transmit instruction data to the power source unit 140, and the battery charging circuit 156 may utilize communication signals X1B and X2B to transmit instruction data to the adaptive buck converter 110.

In some embodiments where the cable 130 is realized with a USB cable, the communication signals X1A and X2A as well as the communication signals X1B and X2B may be realized with the D+ and D− signals defined by USB series specifications.

Alternatively, the communication signals X1A and X2A as well as the communication signals X1B and X2B may be realized with the CC1 and CC2 signals defined by USB-PD (Universal Serial Bus Power Delivery) series specifications.

In practice, the power source unit 140 may be realized with a power adapter, a power bank, a car charger, a display monitor, or any other device capable of supplying programmable DC voltage and programmable current in response to the instruction of the adaptive buck converter 110. In some embodiments where the power source unit 140 is realized with a power adapter, the charging cable 100 may be assembled as a single data transmitting and charging cable. In some embodiments where the power source unit 140 is realized with a power bank or a display monitor, the cable 130 may be provided with a connection terminal (not shown in FIG. 1) for detachably connecting to the power source unit 140.

Additionally, the mobile device 150 may be realized with various portable electronic devices, such as a mobile phone, a tablet PC, a notebook computer, a netbook computer, a portable video display, or the like.

Figure 2:
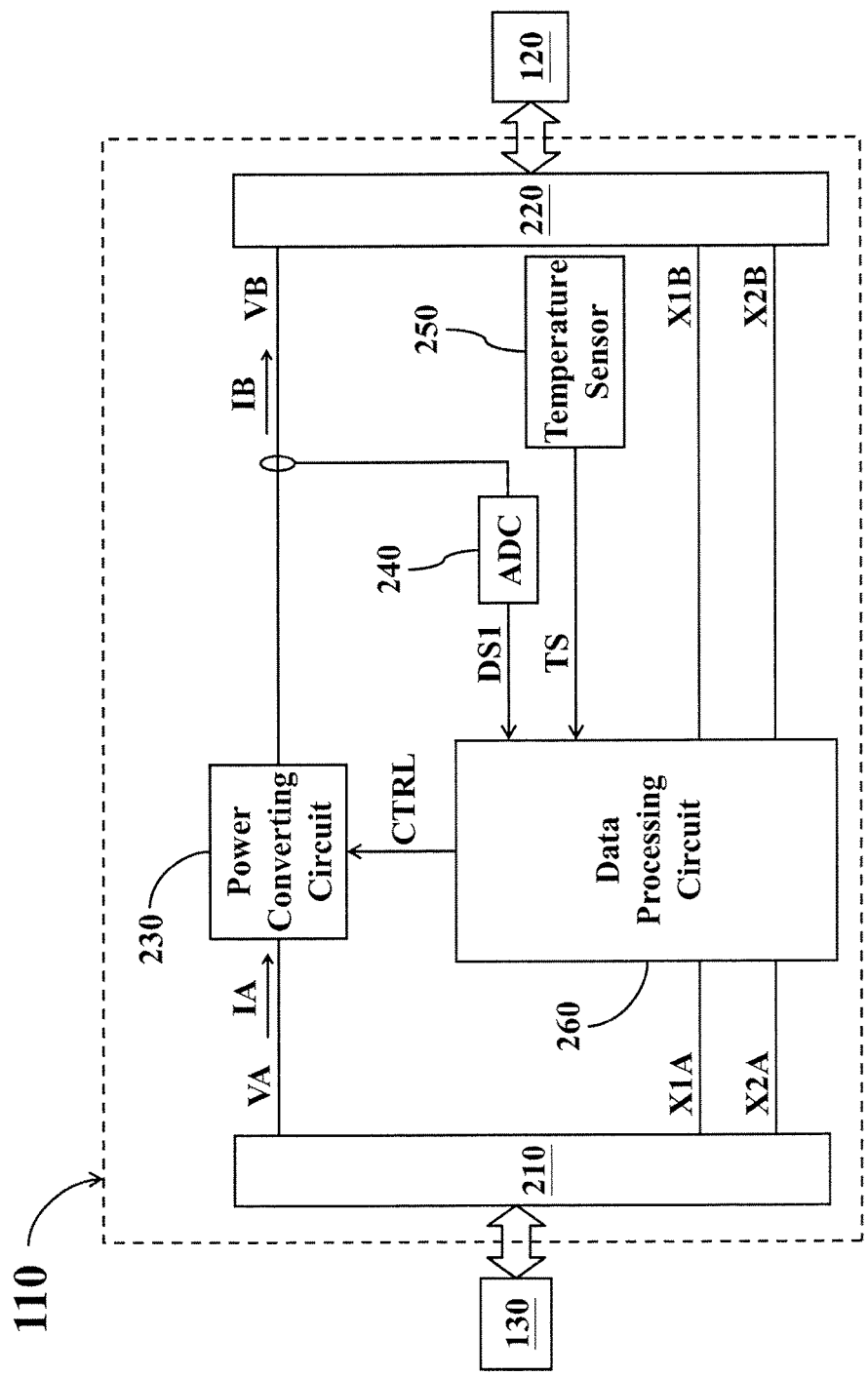
FIG. 2 shows a simplified functional block diagram of an adaptive buck converter of the charging cable in FIG. 1 according to one embodiment of the present disclosure.

Please refer to FIG. 2, which shows a simplified functional block diagram of the adaptive buck converter 110 of the charging cable 100 according to one embodiment of the present disclosure.

As shown in FIG. 2, the adaptive buck converter 110 comprises a power receiving interface 210, a terminal communication interface 220, a power converting circuit 230, a first ADC (analog-to-digital converter) 240, a temperature sensor 250, and a data processing circuit 260.

The power receiving interface 210 is arranged to operably receive the DC voltage VA and the cable current IA from the cable 130 and to operably communicate with the power source unit 140 through the cable 130. The terminal communication interface 220 is arranged to operably transmit the charging voltage VB and the charging current IB to the connection terminal 120 and to operably receive the communication signals X1B and X2B generated by the mobile device 150 from the connection terminal 120. In practice, each of the power receiving interface 210 and the terminal communication interface 220 may be realized with a signal bus or a set of circuitry pins or signal pads.

The power converting circuit 230 is coupled between the power receiving interface 210 and the terminal communication interface 220. The power converting circuit 230 is arranged to operably receive the DC voltage VA and the cable current IA from the power receiving interface 210 and to operably generate the charging voltage VB and the charging current IB in response to a control signal CTRL. As described previously, the charging voltage VB is lower than the DC voltage VA while the charging current IB is greater than the cable current IA.

For example, the charging current IB generated by the power converting circuit 230 may be configured to be 5A, 8A, 10A, or even larger magnitude to effectively expedite the charging operation of the mobile device 150.

Please note that there is no switch device positioned on a current path between the power receiving interface 210 and the input terminal of the power converting circuit 230.

The first ADC 240 is coupled with the output of the power converting circuit 230, and arranged to operably generate a first digital signal DS1 corresponding to at least one of the charging voltage VB and the charging current IB.

The temperature sensor 250 is coupled with the data processing circuit 260, and arranged to operably sense temperature of the connection terminal 120 to generate a temperature indicator signal TS. In some embodiments, the temperature sensor 250 may be positioned close to the connection terminal 120.

As described previously, the connection terminal 120 is detachably connected with the connector 152 when the charging cable 100 is employed to charge the battery 154 of the mobile device 150. During the charging operation of the battery 154, the battery 154 and/or the battery charging circuit 156 inevitably generate heat. Due to the volume and size restriction of the mobile device 150, the heat dissipation device of the mobile device 150 is not possible to immediately dissipate the heat to outside space. As a result, the temperature of the mobile device 150 would inevitably increase during the charging operation. Through the thermal conduction between the connector 152 and the connection terminal 120, the temperature sensor 250 may indirectly detect the temperature of the mobile device 150 by sensing the temperature of the connection terminal 120.

In some embodiments where the terminal communication interface 220 is positioned close to the connection terminal 120, the temperature sensor 250 may be arranged close to the terminal communication interface 220 and indirectly sense the temperature of the connection terminal 120 through the thermal conduction between the terminal communication interface 220 and the connection terminal 120.

The data processing circuit 260 is coupled with the power receiving interface 210, the terminal communication interface 220, the power converting circuit 230, the first ADC 240, and the temperature sensor 250. The data processing circuit 260 is arranged to operably generate the control signal CTRL according to the communication signals X1B and X2B, the first digital signal DS1, and further in view of the temperature indicator signal TS.

For example, when the communication signals X1B and X2B indicates that the mobile device 150 is requesting for a higher charging voltage and/or a larger charging current, the data processing circuit 260 may adjust the control signal CTRL to instruct the power converting circuit 230 to increase the charging voltage VB and/or the charging current IB. On the contrary, when the communication signals X1B and X2B indicates that the mobile device 150 is requesting for a lower charging voltage and/or a smaller charging current, the data processing circuit 260 may adjust the control signal CTRL to instruct the power converting circuit 230 to reduce the charging voltage VB and/or the charging current IB.

When the data processing circuit 260 determines that the charging voltage VB and/or the charging current IB exceeds a desired level based on the first digital signal DS1, the data processing circuit 260 may adjust the control signal CTRL to instruct the power converting circuit 230 to reduce the charging voltage VB and/or the charging current IB. On the contrary, when the data processing circuit 260 determines that the charging voltage VB and/or the charging current IB is below a desired level based on the first digital signal DS1, the data processing circuit 260 may adjust the control signal CTRL to instruct the power converting circuit 230 to increase the charging voltage VB and/or the charging current IB.

In addition, the data processing circuit 260 may adjust the control signal CTRL to instruct the power converting circuit 230 to reduce the charging voltage VB and/or the charging current IB when the temperature indicator signal TS indicates that the temperature of the connection terminal 120 increases.

In other embodiments, the data processing circuit 260 may adjust the control signal CTRL to instruct the power converting circuit 230 to reduce the charging voltage VB and/or the charging current IB when the temperature indicator signal TS indicates that the temperature of the connection terminal 120 exceeds a predetermined threshold level.

In addition, the data processing circuit 260 is further arranged to operably generate the communication signals X1A and X2A according to the communication signals X1B and X2B, the first digital signal DS1, and further in view of the temperature indicator signal TS. As described previously, the data processing circuit 260 transmits the communication signals X1A and X2A to the power source unit 140 through the power receiving interface 210 and the cable 130.

For example, when the communication signals X1B and X2B indicates that the mobile device 150 is requesting for a higher charging voltage and/or a larger charging current, the data processing circuit 260 may adjust the communication signals X1A and X2A to instruct the power source unit 140 to increase the DC voltage VA and/or the cable current IA. On the contrary, when the communication signals X1B and X2B indicates that the mobile device 150 is requesting for a lower charging voltage and/or a smaller charging current, the data processing circuit 260 may adjust the communication signals X1A and X2A to instruct the power source unit 140 to reduce the DC voltage VA and/or the cable current IA.

When the data processing circuit 260 determines that the charging voltage VB and/or the charging current IB exceeds a desired level based on the first digital signal DS1, the data processing circuit 260 may adjust the communication signals X1A and X2A to instruct the power source unit 140 to reduce the DC voltage VA and/or the cable current IA. On the contrary, when the data processing circuit 260 determines that the charging voltage VB and/or the charging current IB is below a desired level based on the first digital signal DS1, the data processing circuit 260 may adjust the communication signals X1A and X2A to instruct the power source unit 140 to increase the DC voltage VA and/or the cable current IA.

In addition, the data processing circuit 260 may adjust the communication signals X1A and X2A to instruct the power source unit 140 to reduce the DC voltage VA and/or the cable current IA when the temperature indicator signal TS indicates that the temperature of the connection terminal 120 increases.

In other embodiments, the data processing circuit 260 may adjust the communication signals X1A and X2A to instruct the power source unit 140 to reduce the DC voltage VA and/or the cable current IA when the temperature indicator signal TS indicates that the temperature of the connection terminal 120 exceeds a predetermined threshold level.

In practice, the data processing circuit 260 may be realized with various digital circuits, or a combination of digital circuits and analog circuits.

As can be appreciated from the foregoing elaborations, the data processing circuit 260 may adjust the control signal CTRL and/or the communication signals X1A and X2A based on the temperature indicator signal TS. Accordingly, the charging voltage VB and charging current IB generated by the adaptive buck converter 110 can be adaptively modified based on the thermal condition of the connector 152 or the mobile device 150. From one aspect, the adaptive buck converter 110 offers an additional over temperature protection to the mobile device 150.

In practice, the data processing circuit 260 may utilize the communication signals X1B and X2B to report the temperature sensing result of the temperature sensor 250 to the battery charging circuit 156, so that the battery charging circuit 156 is enabled to have more information about the thermal condition of the connector 152 or the mobile device 150.

Figure 3:
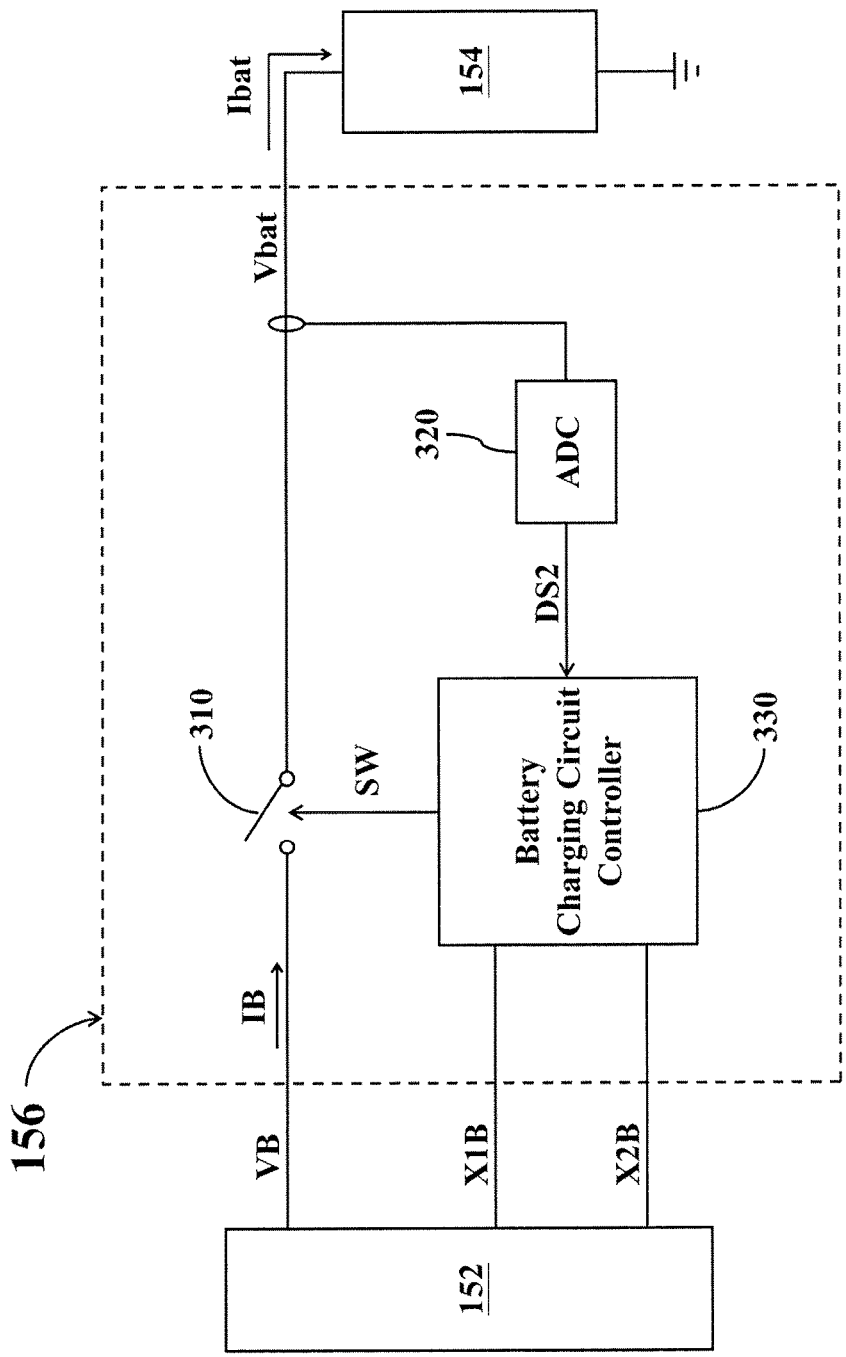
FIG. 3 shows a simplified functional block diagram of a battery charging circuit of the mobile device in FIG. 1 according to one embodiment of the present disclosure.

Please refer to FIG. 3, which shows a simplified functional block diagram of the battery charging circuit 156 of the mobile device 150 according to one embodiment of the present disclosure. The battery charging circuit 156 comprises a switch device 310, a second ADC 320, and a battery charging circuit controller 330.

The switch device 310 is coupled between the connector 152 and the battery 154. The switch device 310 is arranged to selectively conduct the charging voltage VB and the charging current IB to the battery 154 under control of a switch signal SW.

The second ADC 320 is arranged to operably generate a second digital signal DS2 corresponding to at least one of a battery input voltage Vbat and a battery input current Ibat of the battery 154.

The battery charging circuit controller 330 is coupled with the connector 152, the switch device 310, and the second ADC 320. The battery charging circuit controller 330 is arranged to operably generate and transmit the communication signals X1B and X2B to the charging cable 100 through the connector 152 to instruct the adaptive buck converter 110 to provide appropriate charging voltage VB and charging current IB. Additionally, the battery charging circuit controller 330 is further arranged to operably generate the switch signal SW according to the second digital signal DS2, so as to control the battery input voltage Vbat and the battery input current Ibat.

For example, when the battery charging circuit controller 330 determines that the battery input voltage Vbat and/or the battery input current Ibat exceeds (or is lower than) a desired level based on the second digital signal DS2, the battery charging circuit controller 330 may adjust the switch signal SW to turn off the switch device 310.

When the battery 154 is fully recharged or charged to a predetermined level, the battery charging circuit controller 330 may adjust the switch signal SW to turn off the switch device 310 to protect the battery 154 from over charging.

Figure 4:
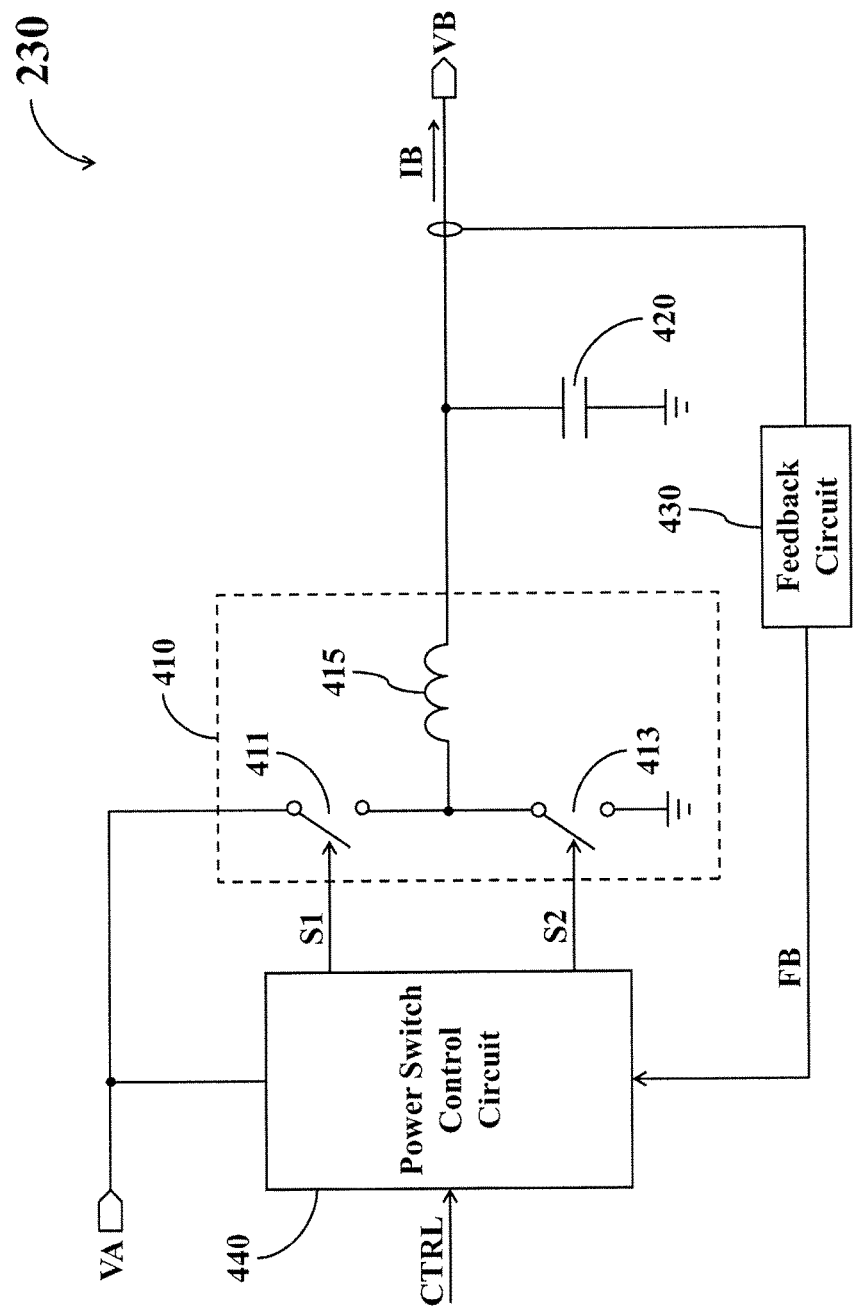
FIG. 4 shows a simplified functional block diagram of a power converting circuit of the adaptive buck converter of FIG. 2 according to one embodiment of the present disclosure.

FIG. 4 shows a simplified functional block diagram of the power converting circuit 230 of the adaptive buck converter 110 according to one embodiment of the present disclosure.

In this embodiment of FIG. 4, the power converting circuit 230 comprises a single power stage 410, an output capacitor 420, a feedback circuit 430, and a power switch control circuit 440.

The power stage 410 is coupled with the input terminal of the power converting circuit 230 and arranged to operably receive the DC voltage VA. The output capacitor 420 is coupled with the output of the power stage 410 and arranged to operably provide the charging voltage VB and the charging current IB to the output terminal of the power converting circuit 230.

In practice, the power stage 410 may be realized with a synchronous power stage or an asynchronous power stage. For example, as shown in FIG. 4, the power stage 410 is realized with a synchronous power stage and comprises an upper switch 411, a lower switch 413, and an inductor 415. The upper switch 411 comprises a first terminal for receiving the DC voltage VA. A first terminal of the lower switch 413 is coupled with a second terminal of the upper switch 411, while a second terminal of the lower switch 413 is coupled with a fixed-level terminal, such as a ground terminal. A first terminal of the inductor 415 is coupled with the second terminal of the upper switch 411 and the first terminal of the lower switch 413, while a second terminal of the inductor 415 is coupled with the output capacitor 420.

The feedback circuit 430 is coupled with the output capacitor 420 and arranged to operably generate a feedback signal FB according to at least one of the charging voltage VB and the charging current IB.

The power switch control circuit 440 is coupled with the power stage 410 and the feedback circuit 430. The power switch control circuit 440 is arranged to operably control switching operations of power switches of the power stage 410 according to the feedback signal FB and the control signal CTRL. For example, the power switch control circuit 440 may generate and utilize switch control signals S1 and S2 to respectively control the switching operations of the upper switch 411 and the lower switch 413, so that the charging voltage VB and the charging current IB provided by the output capacitor 420 meets the instruction of the control signal CTRL.

In practice, the power switch control circuit 440 may be realized with various PWM (pulse width modulation) signal generators or PFM (pulse frequency modulation) signal generators.

The power converting circuit 230 may comprise more than one power stage. For example, FIG. 5 shows a simplified functional block diagram of the power converting circuit 230 according to another embodiment of the present disclosure.

Figure 5:
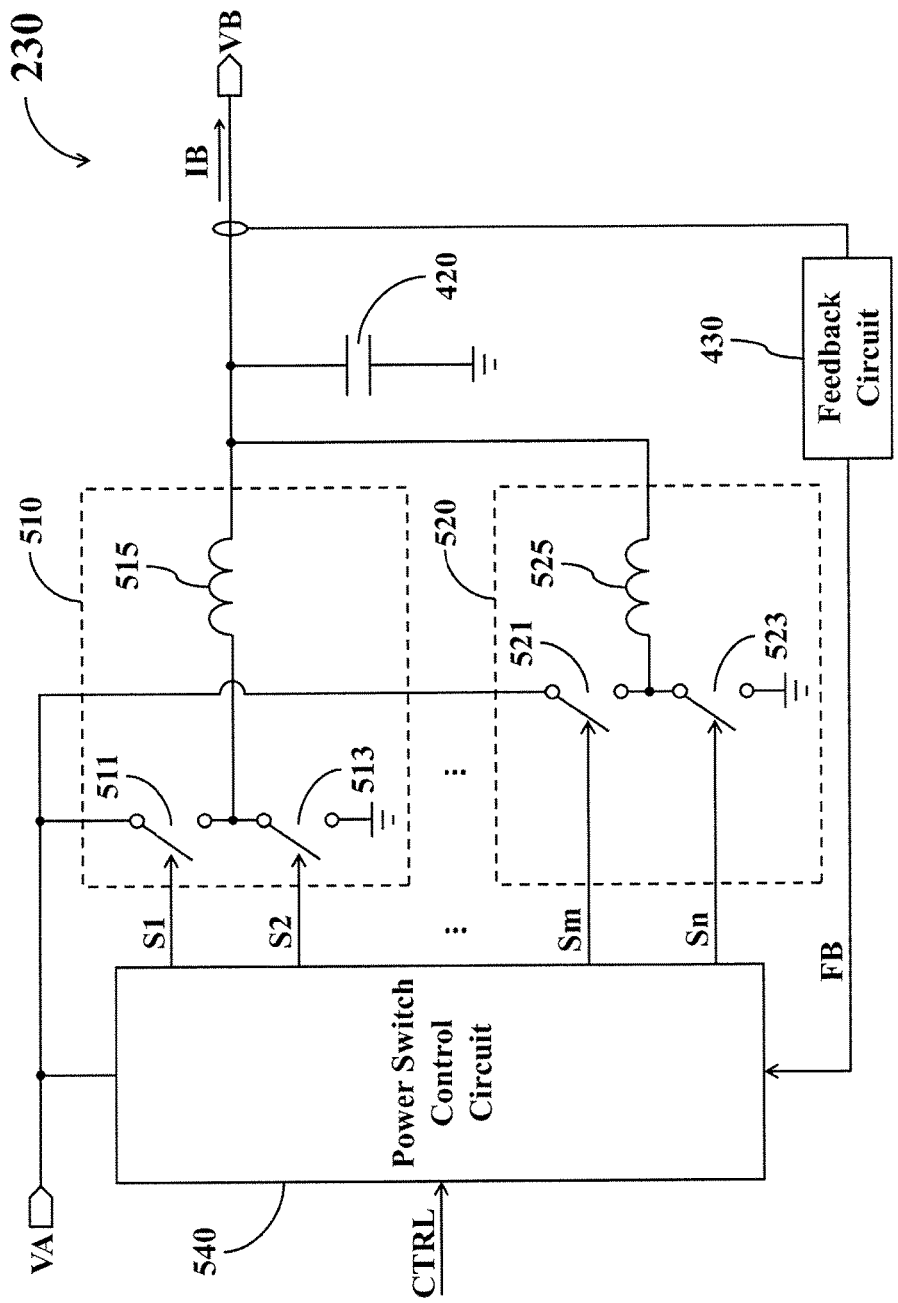
FIG. 5 shows a simplified functional block diagram of a power converting circuit of the adaptive buck converter of FIG. 2 according to another embodiment of the present disclosure.

In the embodiment of FIG. 5, the power converting circuit 230 comprises multiple power stages, the output capacitor 420, the feedback circuit 430, and a power switch control circuit 540. For the purpose of explanatory convenience in the following description, only two exemplary power stages (i.e., a first power stage 510 and a second power stage 520) are illustrated in FIG. 5.

The first power stage 510 is coupled with the input terminal of the power converting circuit 230 and arranged to operably receive the DC voltage VA.

The second power stage 520 is coupled with the input terminal of the power converting circuit 230 and arranged to operably receive the DC voltage VA. In addition, the second power stage 520 is configured in parallel connection with the first power stage 510.

The output capacitor 420 is coupled with the outputs of both the first power stage 510 and the second power stage 520 and arranged to operably provide the charging voltage VB and the charging current IB.

The feedback circuit 430 is coupled with the output capacitor 420, and arranged to operably generate a feedback signal FB according to at least one of the charging voltage VB and the charging current IB.

The power switch control circuit 540 is coupled with the first power stage 510, the second power stage 520, and the feedback circuit 430. The power switch control circuit 540 is arranged to operably control switching operations of power switches in the first power stage 510 and the second power stage 520 according to the feedback signal FB and the control signal CTRL.

In practice, each of the first power stage 510 and the second power stage 520 may be realized with a synchronous power stage or an asynchronous power stage. In the embodiment of FIG. 5, for example, each of the first power stage 510 and the second power stage 520 is realized with a synchronous power stage.

As shown in FIG. 5, the first power stage 510 comprises an upper switch 511, a lower switch 513, and an inductor 515. The upper switch 511 comprises a first terminal for receiving the DC voltage VA. A first terminal of the lower switch 513 is coupled with a second terminal of the upper switch 511, while a second terminal of the lower switch 513 is coupled with a fixed-level terminal, such as a ground terminal. A first terminal of the inductor 515 is coupled with the second terminal of the upper switch 511 and the first terminal of the lower switch 513, while a second terminal of the inductor 515 is coupled with the output capacitor 420.

Similarly, the second power stage 520 comprises an upper switch 521, a lower switch 523, and an inductor 525. The upper switch 521 comprises a first terminal for receiving the DC voltage VA. A first terminal of the lower switch 523 is coupled with a second terminal of the upper switch 521, while a second terminal of the lower switch 523 is coupled with a fixed-level terminal, such as a ground terminal. A first terminal of the inductor 525 is coupled with the second terminal of the upper switch 521 and the first terminal of the lower switch 523, while a second terminal of the inductor 525 is coupled with the output capacitor 420.

The power switch control circuit 540 may generate and utilize switch control signals S1 and S2 to alternatively turn on the upper switch 511 and the lower switch 513 of the first power stage 510. In addition, the power switch control circuit 540 may further generate and utilize switch control signals Sm and Sn to alternatively turn on the upper switch 521 and the lower switch 523 of the second power stage 520. In practice, the power switch control circuit 540 may be realized with various PWM signal generators or PFM signal generators.

As is well known in related art, a higher DC voltage VA may cause a higher power loss and heat at the power stage of the power converting circuit 230, such as the power stage 410 in FIG. 4 or the power stages 510 and 520 in FIG. 5. The development trend of the mobile device 150 is slim and compact, and thus the volume and inner space of the mobile device 150 are very restricted. Therefore, it is very difficult for the mobile device 150 to have sufficient space to install heat dissipation devices required for effectively and rapidly dissipating the heat generated by the power converting circuit 230.

In addition, the components inside the mobile device 150 must be very small due to the volume restriction of the mobile device 150. Accordingly, if the mobile device manufacturer wants to forcedly integrate a power converting circuit into the mobile device 150, then the inductors of the power converting circuit must be very small. As a result, the switching frequency of the power switches of the power converting circuit must be high, which results more power loss at the power switches and the inductors of the power converting circuit.

The power converting circuit 230 in this disclosure is arranged in the adaptive buck converter 110 outside the mobile device 150, and thus the power converting circuit 230 is allowed to use larger inductors. In this situation, the switching frequency of the power switches of the power converting circuit 230 (e.g., the switches 411, 413, 511, 513, 521, and 523) can be much lower than the case where the power converting circuit is arranged inside the mobile device 150. As a result, the power loss of the power converting circuit 230 can be effectively reduced.

Due to the heat dissipation and power efficiency concerns described above, it is obvious that the disclosed power converting circuit 230 is not suitable to be integrated into the mobile device 150.

As can be seen from the foregoing descriptions, the single power stage 410 in the embodiment of FIG. 4 is replaced by multiple power stages in the embodiment of FIG. 5. Hence, the volume and size of each inductor in the embodiment of FIG. 5 can be smaller than the single inductor 415 in the embodiment of FIG. 4. As a result, the volume and size of the entire power converting circuit 230 of FIG. 5 can be greatly reduced compared to the embodiment of FIG. 4. Accordingly, the volume and size of the adaptive buck converter 110 can be effectively reduced by adopting the power converting circuit 230 of FIG. 5 in comparison with the embodiment adopting the power converting circuit 230 of FIG. 4.

Figure 6:
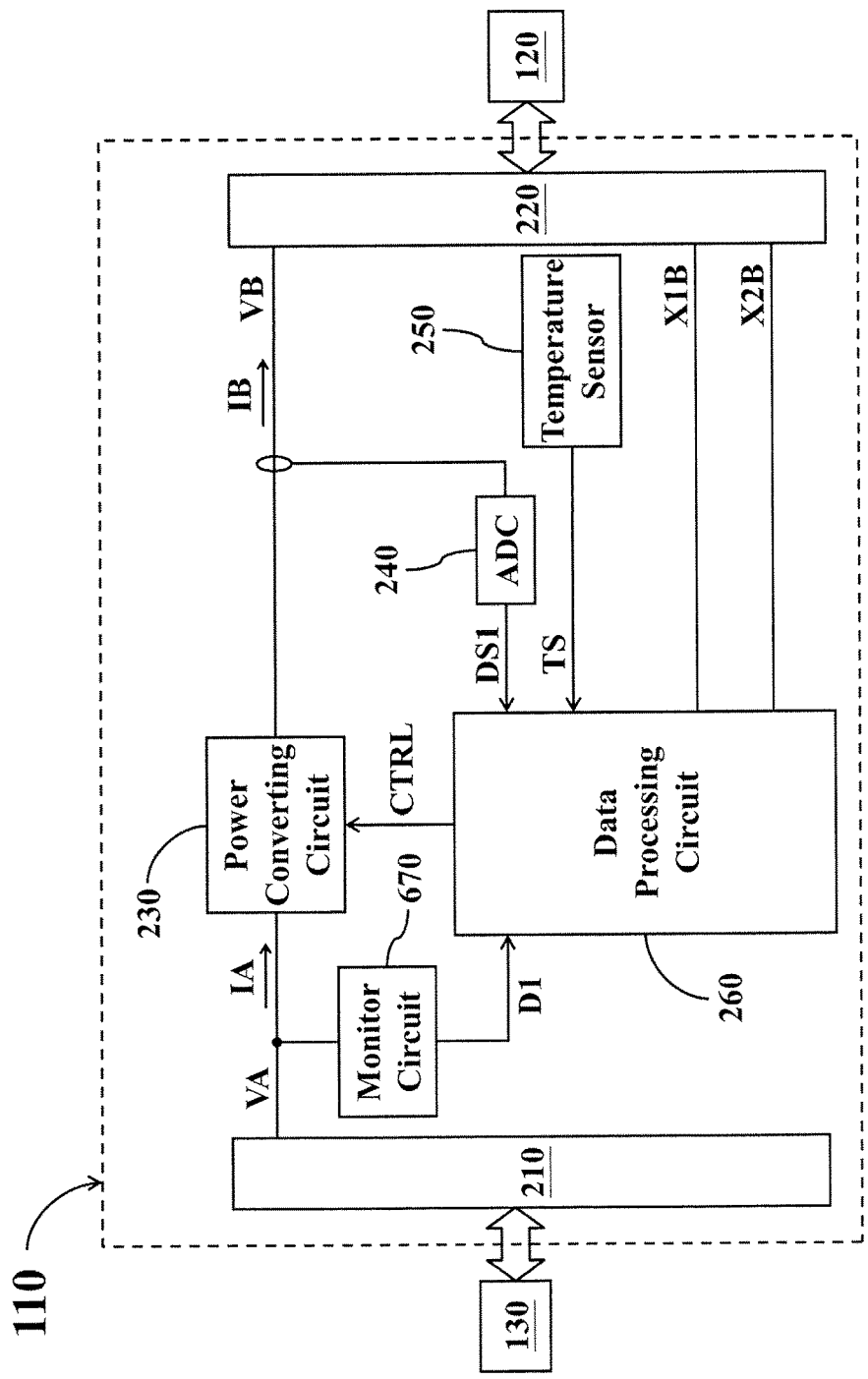
FIG. 6 shows a simplified functional block diagram of an adaptive buck converter of the charging cable in FIG. 1 according to another embodiment of the present disclosure.

Please refer to FIG. 6, which shows a simplified functional block diagram of the adaptive buck converter 110 of the charging cable 100 according to another embodiment of the present disclosure.

The adaptive buck converter 110 in the embodiment of FIG. 6 is somewhat different from the embodiment of FIG. 2. As shown in FIG. 6, the adaptive buck converter 110 further comprises a monitor circuit 670. In addition, unlike the embodiment of FIG. 2, the data processing circuit 260 in the embodiment of FIG. 6 is not coupled with the power receiving interface 210. That is, the data processing circuit 260 in the embodiment of FIG. 6 does not control the power source unit 140 through the power receiving interface 210, and thus the power receiving interface 210 needs not to communicate with the power source unit 140 through the cable 130.

The monitor circuit 670 is coupled with the signal path between the power receiving interface 210 and the power converting circuit 230. The monitor circuit 670 is arranged to operably detect the DC voltage VA or the cable current IA transmitted from the power receiving interface 210 to the power converting circuit 230, and to operably generate a detection signal X1C for representing the detection result. In practice, the monitor circuit 670 may be realized with various voltage and/or current detecting circuits.

In the embodiment of FIG. 6, the data processing circuit 260 is arranged to operably generate the control signal CTRL according to the communication signals X1B and X2B, the first digital signal DS1, and/or the temperature indicator signal TS.

Additionally, the data processing circuit 260 is further coupled with the monitor circuit 670, and arranged to operably receive the detection signal X1C from the monitor circuit 670. In response to the detection result of the monitor circuit 670, the data processing circuit 260 may communicate with the mobile device 150 through the communication signals X1B and X2B, so that the mobile device 150 can correspondingly modify the instruction to the adaptive buck converter 110.

In one embodiment, for example, the data processing circuit 260 may utilize the communication signals X1B and X2B to report the detection result of the monitor circuit 670 to the mobile device 150 through the terminal communication interface 220 and the connection terminal 120. In this embodiment, when the detection result of the monitor circuit 670 is received by the battery charging circuit controller 330 of the battery charging circuit 156, the battery charging circuit controller 330 may adaptively modify the communication signals X1B and X2B, so as to instruct the adaptive buck converter 110 to adjust the magnitude of the charging voltage VB and/or charging current IB. Then, the data processing circuit 260 would control the power converting circuit 230 to adjust the charging voltage VB and/or charging current IB to be transmitted to the mobile device 150 based on the modified communication signals X1B and X2B sent from the mobile device 150.

In another embodiment, the data processing circuit 260 may utilize the communication signals X1B and X2B to transmit a modification suggestion to the mobile device 150 through the terminal communication interface 220 and the connection terminal 120. In this embodiment, when the modification suggestion is received by the battery charging circuit controller 330 of the battery charging circuit 156, the battery charging circuit controller 330 may modify the communication signals X1B and X2B, so as to instruct the adaptive buck converter 110 to correspondingly adjust the magnitude of the charging voltage VB and/or charging current IB. Then, the data processing circuit 260 would control the power converting circuit 230 to adjust the charging voltage VB and/or charging current IB to be transmitted to the mobile device 150 based on the modified communication signals X1B and X2B sent from the mobile device 150.

In either way described above, the charging operation of the battery 154 of the mobile device 150 can be adaptively manipulated in accordance with the DC voltage VA or the cable current IA supplied from the power source unit 140.

The foregoing descriptions regarding the implementations, connections, operations, and related advantages of other corresponding functional blocks in the adaptive buck converter 110 of FIG. 2 are also applicable to the adaptive buck converter 110 FIG. 6. For the sake of brevity, those descriptions will not be repeated here.

According to the foregoing elaborations, it can be appreciated that there is no volume and size restriction to the components of the adaptive buck converter 110 since the adaptive buck converter 110 is outside the mobile device 150. Accordingly, there is no volume and size restriction to the components (e.g., the inductors) of the power converting circuit 230 inside the adaptive buck converter 110. As a result, the switching frequency of the power switches of the power converting circuit 230 can be lowered to reduce the power loss at the power stages of the power converting circuit 230.

In addition, since the cable 130 only needs to transmit a small cable current IA, the cable 130 can be realized with a thin and long cable, instead of a thick and short power cable.

Furthermore, since the disclosed adaptive buck converter 110 converts the cable current IA supplied by the power source unit 140 into a much larger charging current IB, the charging speed of the battery 154 can be effectively increased and thus reduce the required time for charging the battery 154.

In addition, the adaptive buck converter 110 is able to adaptively modify the charging voltage VB and the charging current IB according to the communication signal generated by the mobile device 150. Accordingly, the disclosed adaptive buck converter 110 can be utilized to charge different kinds of mobile devices, and thus can be employed in various applications.

In some embodiments, the power source unit 140 may be configured to simply supply the DC voltage VA at a fixed voltage level. In this situation, the circuitry of the data processing circuit 260 may be simplified since there is no need to generate the communication signals X1A and X2A described above.

In some embodiments, the first ADC 240 and/or the temperature sensor 250 may be omitted to simplify the circuitry complexity of the adaptive buck converter 110.

In the previous descriptions, each of the power stages of the power converting circuit 230 is realized with a synchronous power stage. This is merely an exemplary embodiment, rather than a restriction to the practice implementations. For example, each of the power stages 410, 510, and 520 shown in FIG. 4 and FIG. 5 may be instead realized to be an asynchronous power stage.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

The term "voltage signal" used throughout the description and the claims may be expressed in the format of a current in implementations, and the term "current signal" used throughout the description and the claims may be expressed in the format of a voltage in implementations.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A charging cable (100) for charging a mobile device (150), comprising:
   an adaptive buck converter (110);
   a connection terminal (120) coupled with the adaptive buck converter (110) and utilized for detachably connecting to the mobile device (150);
   a cable (130) coupled with the adaptive buck converter (110); and a power source unit (140) connected to the cable (130) and utilized for supplying a DC (direct current) voltage (VA) and a cable current (IA) to the cable (130);

wherein the adaptive buck converter (110) comprises:

a power receiving interface (210) arranged to operably receive the DC voltage (VA) and the cable current (IA) from the cable (130);

a terminal communication interface (220) arranged to operably transmit a charging voltage (VB) and a charging current (IB) to the connection terminal (120) and to operably receive a communication signal (X1B; X2B) generated by the mobile device (150) from the connection terminal (120);

a power converting circuit (230), coupled between the power receiving interface (210) and the terminal communication interface (220), arranged to operably receive the DC voltage (VA) and the cable current (IA) from the power receiving interface (210) and to operably generate the charging voltage (VB) and the charging current (IB), wherein the charging voltage (VB) is lower than the DC voltage (VA) while the charging current (IB) is greater than the cable current (IA);

a monitor circuit (670), coupled with a signal path between the power receiving interface (210) and the power converting circuit (230), arranged to operably detect the DC voltage (VA) or the cable current (IA); and a data processing circuit (260), coupled with the terminal communication interface (220) and the power converting circuit (230), arranged to operably control the power converting circuit (230) according to the communication signal (X1B; X2B);

wherein the data processing circuit (260) is further coupled with the monitor circuit (670) and arranged to operably utilize the communication signal (X1B; X2B) to report a detection result of the monitor circuit (670) to the mobile device (150) through the terminal communication interface (220) and the connection terminal (120).

2. The charging cable (100) of claim 1, wherein the adaptive buck converter (110) further comprises:

a first ADC (analog-to-digital converter) (240), coupled with the data processing circuit (260), arranged to operably generate a first digital signal (DS1) corresponding to at least one of the charging voltage (VB) and the charging current (IB);

wherein the data processing circuit (260) controls the power converting circuit (230) according to the communication signal (X1B; X2B) and further in view of the first digital signal (DS1).

3. The charging cable (100) of claim 1, wherein the adaptive buck converter (110) further comprises:

a temperature sensor (250), coupled with the data processing circuit (260), arranged to operably sense temperature of the connection terminal (120);

wherein the data processing circuit (260) controls the power converting circuit (230) according to the communication signal (X1B; X2B) and further in view of a sensing result of the temperature sensor (250).

4. The charging cable (100) of claim 3, wherein the adaptive buck converter (110) further comprises:

a first ADC (240), coupled with the data processing circuit (260), arranged to operably generate a first digital signal (DS1) corresponding to at least one of the charging voltage (VB) and the charging current (IB);

wherein the data processing circuit (260) controls the power converting circuit (230) according to the communication signal (X1B; X2B), the sensing result of the temperature sensor (250), and further in view of the first digital signal (DS1).

5. The charging cable (100) of claim 3, wherein the data processing circuit (260) controls the power converting circuit (230) to reduce at least one of the charging voltage (VB) and the charging current (IB) when the temperature of the connection terminal (120) increases.

6. The charging cable (100) of claim 3, wherein the data processing circuit (260) controls the power converting circuit (230) to reduce at least one of the charging voltage (VB) and the charging current (TB) when the temperature of the connection terminal (120) exceeds a predetermined threshold level.

7. The charging cable (100) of claim 1, wherein the power converting circuit (230) comprises:

a first power stage (510) arranged to operably receive the DC voltage (VA);

a second power stage (520) arranged to operably receive the DC voltage (VA) and configured in parallel connection with the first power stage (510);

an output capacitor (420), coupled with outputs of the first power stage (510) and the second power stage (520), arranged to operably provide the charging voltage (VB) and the charging current (IB);

a feedback circuit (430), coupled with the output capacitor (420), arranged to operably generate a feedback signal (FB) according to at least one of the charging voltage (VB) and the charging current (IB); and a power switch control circuit (540), coupled with the first power stage (510), the second power stage (520), and the feedback circuit (430), arranged to operably control energy conversion operations of the first power stage (510) and the second power stage (520) according to the feedback signal (FB) under control of the data processing circuit (260).

8. The charging cable (100) of claim 7, wherein each of the first power stage (510) and the second power stage (520) is a synchronous power stage and comprises:

an upper switch (511; 521), comprising a first terminal for receiving the DC voltage (VA);

a lower switch (513; 523), wherein a first terminal of the lower switch (513; 523) is coupled with a second terminal of the upper switch (511; 521), while a second terminal of the lower switch (513; 523) is coupled with a fixed-level terminal; and an inductor (515; 525), wherein a first terminal of the inductor (515; 525) is coupled with the second terminal of the upper switch (511; 521) and the first terminal of the lower switch (513; 523), while a second terminal of the inductor (515; 525) is coupled with the output capacitor (420);

wherein the power switch control circuit (540) alternatively turns on the upper switch (511; 521) and the lower switch (513; 523).

9. The charging cable (100) of claim 1, wherein there is no switch device positioned on a current path between the power receiving interface (210) and an input terminal of the power converting circuit (230).

10. The charging cable (100) of claim 1, wherein the power source unit (140) is not controlled by the data processing circuit (260).

11. An adaptive buck converter (110) of a charging cable (100), wherein the charging cable (100) is utilized for charging a mobile device (150) and comprises a connection terminal (120) utilized for detachably connecting to the mobile device (150); a cable (130); and a power source unit (140) utilized for supplying a DC (direct current) voltage (VA) and a cable current (IA) to the cable (130), the adaptive buck converter (110) comprising:

a power receiving interface (210) arranged to operably receive the DC voltage (VA) and the cable current (IA) from the cable (130);

a terminal communication interface (220) arranged to operably transmit a charging voltage (VB) and a charging current (IB) to the connection terminal (120) and to operably receive a communication signal (X1B; X2B) generated by the mobile device (150) from the connection terminal (120);

a power converting circuit (230), coupled between the power receiving interface (210) and the terminal communication interface (220), arranged to operably receive the DC voltage (VA) and the cable current (IA) from the power receiving interface (210) and to operably generate the charging voltage (VB) and the charging current (IB), wherein the charging voltage (VB) is lower than the DC voltage (VA) while the charging current (IB) is greater than the cable current (IA);

a monitor circuit (670), coupled with a signal path between the power receiving interface (210) and the power converting circuit (230), arranged to operably detect the DC voltage (VA) or the cable current (IA); and a data processing circuit (260), coupled with the terminal communication interface (220) and the power converting circuit (230), arranged to operably control the power converting circuit (230) according to the communication signal (X1B; X2B);

wherein the data processing circuit (260) is further coupled with the monitor circuit (670) and arranged to operably utilize the communication signal (X1B; X2B) to report a detection result of the monitor circuit (670) to the mobile device (150) through the terminal communication interface (220) and the connection terminal (120).

12. The adaptive buck converter (110) of claim 11, further comprising:

a first ADC (240), coupled with the data processing circuit (260), arranged to operably generate a first digital signal (DS1) corresponding to at least one of the charging voltage (VB) and the charging current (IB);

wherein the data processing circuit (260) controls the power converting circuit (230) according to the communication signal (X1B; X2B) and further in view of the first digital signal (DS1).

13. The adaptive buck converter (110) of claim 11, further comprising:

a temperature sensor (250), coupled with the data processing circuit (260), arranged to operably sense temperature of the connection terminal (120);

wherein the data processing circuit (260) controls the power converting circuit (230) according to the communication signal (X1B; X2B) and further in view of a sensing result of the temperature sensor (250).

14. The adaptive buck converter (110) of claim 13, further comprising:

a first ADC (240), coupled with the data processing circuit (260), arranged to operably generate a first digital signal (DS1) corresponding to at least one of the charging voltage (VB) and the charging current (IB);

wherein the data processing circuit (260) controls the power converting circuit (230) according to the communication signal (X1B; X2B), the sensing result of the temperature sensor (250), and further in view of the first digital signal (DS1).

15. The adaptive buck converter (110) of claim 13, wherein the data processing circuit (260) controls the power converting circuit (230) to reduce at least one of the charging voltage (VB) and the charging current (IB) when the temperature of the connection terminal (120) increases.

16. The adaptive buck converter (110) of claim 13, wherein the data processing circuit (260) controls the power converting circuit (230) to reduce at least one of the charging voltage (VB) and the charging current (IB) when the temperature of the connection terminal (120) exceeds a predetermined threshold level.

17. The adaptive buck converter (110) of claim 11, wherein the power converting circuit (230) comprises:

a first power stage (510) arranged to operably receive the DC voltage (VA);

a second power stage (520) arranged to operably receive the DC voltage (VA) and configured in parallel connection with the first power stage (510);

an output capacitor (420), coupled with outputs of the first power stage (510) and the second power stage (520), arranged to operably provide the charging voltage (VB) and the charging current (IB);

a feedback circuit (430), coupled with the output capacitor (420), arranged to operably generate a feedback signal (FB) according to at least one of the charging voltage (VB) and the charging current (IB); and a power switch control circuit (540), coupled with the first power stage (510), the second power stage (520), and the feedback circuit (430), arranged to operably control energy conversion operations of the first power stage (510) and the second power stage (520) according to the feedback signal (FB) under control of the data processing circuit (260).

18. The adaptive buck converter (110) of claim 17, wherein each of the first power stage (510) and the second power stage (520) is a synchronous power stage and comprises:

an upper switch (511; 521), comprising a first terminal for receiving the DC voltage (VA);

a lower switch (513; 523), wherein a first terminal of the lower switch (513; 523) is coupled with a second terminal of the upper switch (511; 521), while a second terminal of the lower switch (513; 523) is coupled with a fixed-level terminal; and an inductor (515; 525), wherein a first terminal of the inductor (515; 525) is coupled with the second terminal of the upper switch (511; 521) and the first terminal of the lower switch (513; 523), while a second terminal of the inductor (515; 525) is coupled with the output capacitor (420);

wherein the power switch control circuit (540) alternatively turns on the upper switch (511; 521) and the lower switch (513; 523).

19. The adaptive buck converter (110) of claim 11, wherein there is no switch device positioned on a current path between the power receiving interface (210) and an input terminal of the power converting circuit (230).

20. The adaptive buck converter (110) of claim 11, wherein the power source unit (140) is not controlled by the data processing circuit (260).

* * * * *